O. C. RITZ-WOLLER.
GASOLENE GAGE.
APPLICATION FILED MAY 31, 1916.
1,257,929.
Patented Feb. 26, 1918.
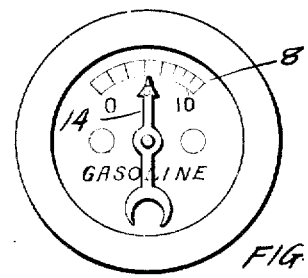
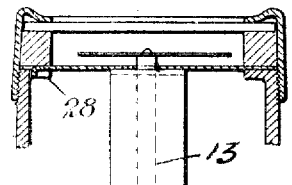
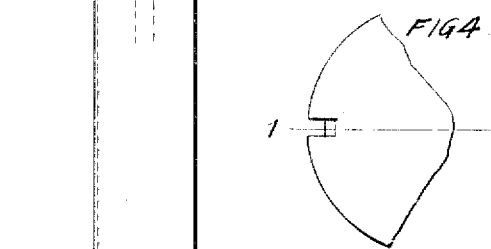
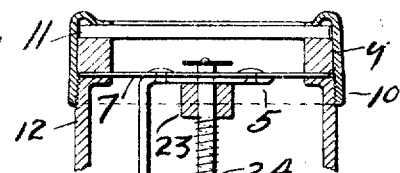
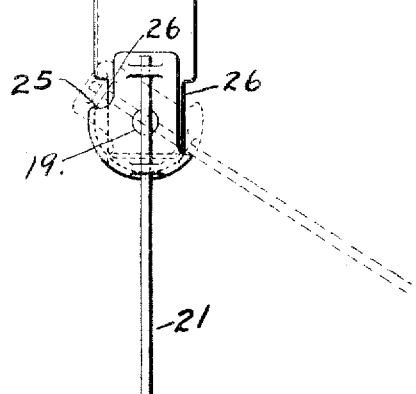
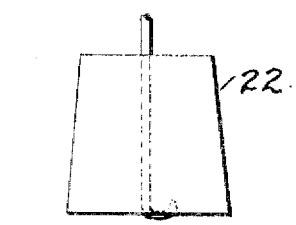
INVENTOR.
OLIVER C. RITZ WOLLER
BY
Daniel Brennan
ATTORNEY

UNITED STATES PATENT OFFICE.

OLIVER C. RITZ-WOLLER, OF CHICAGO, ILLINOIS.

GASOLENE-GAGE.

1,257,929.   Specification of Letters Patent.   Patented Feb. 26, 1918.

Application filed May 31, 1916. Serial No. 100,993.

*To all whom it may concern:*

Be it known that I, OLIVER C. RITZ-WOLLER, a citizen of the United States, residing at Chicago, in the county of Cook and State of Illinois, have invented certain new and useful Improvements in Gasolene-Gages, of which the following is a specification.

The present invention relates to a device for giving an outward indication of the amount of gasolene or other liquid within a receptacle.

The principal objects of the invention are, to provide a dial and an indicator coöperating with the dial, and to actuate said indicator across the surface of the dial in correspondence with the decrease or increase of liquid within the receptacle.

Further objects of the invention are, to provide a cheap and simple mechanism for producing the above result; to provide a suitable washer or packing for preventing leakage of liquid around the opening in the dial; to provide a main supporting member; to mount a shiftable member upon the supporting member; to arrange said shiftable member so that it receives a float member; and to form a connection between the shiftable member and pointer or indicator, whereby the latter is actuated by the movements of the shiftable member, which latter member is actuated by the movements of the float member, thus placing the movements of the indicator directly under the control of the float member.

The invention further consists in the features of construction and the combination of parts hereinafter described and claimed.

In the drawings:

Figure 1 is a plan view of the device;

Fig. 2, a vertical section through the device;

Fig. 3, a side elevation of the device, with the dial and cap ring in section.

Fig. 4 is a plan view showing a portion of a dial. Fig. 5 is a sectional view taken on line 1—1 of Fig. 4.

In the art to which the present invention relates, and particularly in connection with automobiles, it is desirable to have some outward means by which the driver can determine the amount of gasolene within the tank at a glance, thus dispensing with the necessity of removing the covering of the tank and using the ordinary measuring stick.

And it is to produce a simple mechanism for enabling a determination of the amount of liquid by means located exteriorly of the tank that the present invention has been designed.

Referring now to the drawings, the structure comprises a frame or mounting 4, which is formed of a single piece of metal, and which, in the construction shown, is bent at each end to produce what may be termed an upper lug or flange 5 and a lower lug or flange 6. Secured to the lug 5 in a suitable manner is a dial 7, having thereon various scale marks 8, which designate a certain amount of liquid.

Arranged above the dial is a ring of cork or other suitable material, and said ring is clamped in place by means of a flange cap-piece 10, which is cut out at its center to leave an opening. And interposed between this cap 10 and the ring 9 is a disk 11 of glass or other transparent material. The cap-piece 10 is connected in a suitable manner to a portion 12 of the car body. A portion of a dial 7, is bent downward as at 27, to fit into an opening 28 in the upper flange of a portion of the body 12.

Extending through the flanges 5 and 6 and also through the dial 7 is a rod 13, which has a turning fit within the lugs and dial; and secured to the upper end of this rod is a pointer or indicator 14, which is located above the dial and which coöperates with the scale marks 8 to give the indication of the amount of gasolene within the tank.

Secured to the lower end of the rod 13 is a pinion 15, the teeth of which pinion, in the construction shown, mesh with the teeth of a circular rack 16 formed on the edge of a flange 17 extending from a plate 18. This plate is pivoted to the frame 4, as at 19, by some suitable means, so that it may shift back and forth; and the plate is further formed with straps or bands 20 adapted to receive a rod or suitable member 21, which in turn is joined to and extends from a float member 22.

The float member is designed to remain on top of the liquid within the receptacle, and as the float rises and falls, it obviously rocks the plate 18 about its pivotal center, shifting the same. This moves the rack 16 on the flange 17 of said plate, which in turn causes a rotation of the pinion 15, thereby rotating the rod 13 and the pointer 14, and moves the pointer across the face of the dial in accordance with the increase or decrease of the amount of liquid within the tank.

In order to prevent leakage about the point where the rod 13 passes through the dial, I provide a washer 23 of felt or other suitable substance, and also provide a spring 24 about the rod 13 for maintaining this washer in position.

The bending of the plate 18 to produce the flange 17 forms shoulders 25 at each end of the flange. These shoulders coöperate with the sides 26 at the end of the supporting frame 4, to form a stop limiting the movement of the plate 18 in either direction. This is to insure the rack and pinion being maintained in continual engagement, so that the pointer or indicator 14 is always under the direct control of the float member.

From the foregoing it will be apparent that the device of the present invention is extremely simple in construction and consequently cheap of manufacture, and that it contains no involved nor intricate parts that would be liable to become disarranged in ordinary use.

I claim:

1. In a gasolene gage, in combination with a portion of a gasolene tank, a circular dial resting directly on said portion, a yoke comprising a longitudinal reinforced rib and two end walls, one of said end walls being riveted to said dial, a rotary shaft supported between the end walls of the yoke and projecting beyond the dial, a gear rigidly secured to the outer end of the shaft projecting through one end wall, a toothed segment pivotally mounted on the outer surface of the yoke and in engagement with the gear, and a float detachably secured to said toothed segment in such manner that the distance of the lower end of the float from the pivot of the segment may be varied.

2. In a gasolene gage, in combination with a portion of a gasolene tank, a dial mounted directly on said portion, a yoke riveted to said dial at diametrically opposite points with respect to the center portion of the same, said yoke comprising a longitudinal reinforced rib and end walls, a rotary shaft mounted in the end walls and projecting through both of the same and through the dial, a gear rigidly mounted on said rotary shaft at the end projecting through one end wall, a toothed segment mounted pivotally on the longitudinal portion of the yoke at the surface directed away from the shaft, a float support adjustably mounted on the pivotal toothed segment at the outer surface of the same, and a float connected with said support.

3. In a gasolene gage, in combination with a flanged portion of a gasolene tank, a dial non rotatably secured to said flanged portion, a yoke riveted to the lower face of the dial and comprising a longitudinal portion and two end walls, a shaft rotatably supported in said end walls and projecting through said end walls and dial, a float controlled segment pivotally mounted on the longitudinal portion of the yoke, a gear on the shaft in engagement with the segment, a washer in engagement with the lower face of the upper end wall of the yoke and surrounding the rotary shaft, and a spring resting on the other end wall and pressing against said shaft for maintaining said washer yieldingly in fluid tight engagement with the other end wall.

4. In a gasolene gage, the combination with a tank, a dial, mounted on said tank, a yoke bent to form two end walls, one of said end walls being secured to said dial, a rotary shaft supported between the end walls of the yoke, and projecting beyond the dial, a gear rigidly secured to the outer end of the shaft, a toothed segment pivotally mounted on the outer surface of the yoke and in engagement with said gear, and a float connected to said toothed segment, whereby movement of said float rotates said shaft.

5. In a gasolene gage, in combination with a portion of a tank, a circular dial, a lip punched from the plane of the dial and projecting downwardly, said circular portion of the tank being provided with a flange which has a recess adapted to receive said lip, a yoke riveted to said dial, an indicator shaft supported by the yoke, a gear on said indicator shaft, and a float controlled sector pivotally mounted on the yoke in engagement with said gear.

OLIVER C. RITZ-WOLLER.